T. J. LOVETT.
METHOD OF TREATING ORE.
APPLICATION FILED SEPT. 9, 1912.
Reissued Jan. 21, 1913. 13,517.
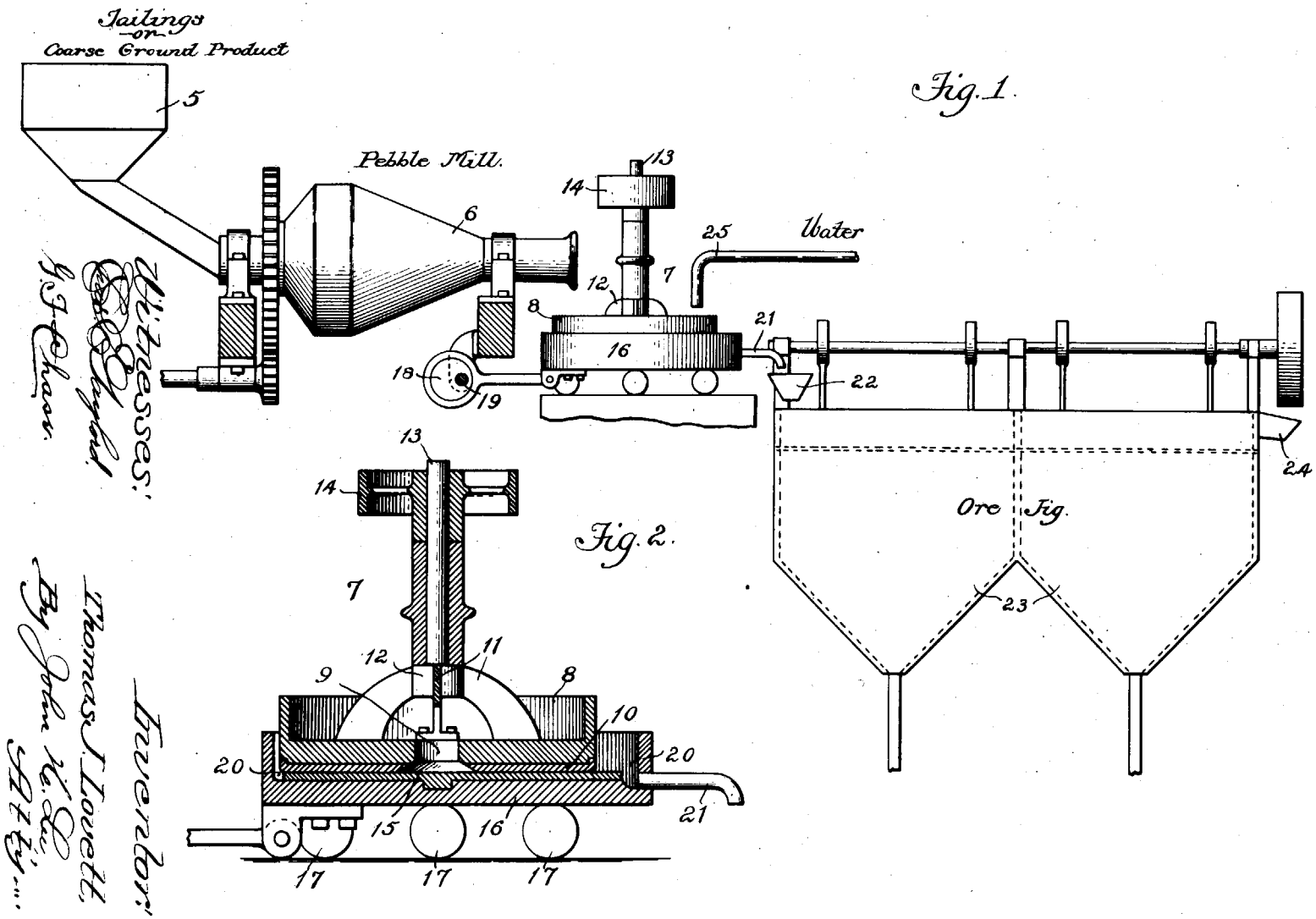
Witnesses:
Geo. Gaylord.
G. F. Chase.
Inventor:
Thomas J. Lovett,
By John H. Lee,
Att'y.

UNITED STATES PATENT OFFICE.

THOMAS J. LOVETT, OF CHICAGO, ILLINOIS.

METHOD OF TREATING ORE.

13,517. Specification of Reissued Letters Patent. Reissued Jan. 21, 1913.

Original No. 979,180, dated December 20, 1910, Serial No. 564,731. Application for reissue filed September 9, 1912. Serial No. 719,480.

*To all whom it may concern:*

Be it known that I, THOMAS J. LOVETT, a citizen of the United States, residing at Chicago, Cook county, State of Illinois, have invented a new and useful Method of Treating Ore; and I do hereby declare the following to be a full, clear, and exact description of the invention, such as will enable others skilled in the art to which it appertains to practise the same.

My present process is especially adapted for the treatment of ore containing native ductile metal, and more particularly copper ore in which the copper is in metallic form and, to a large extent at least, in the condition of minute particles distributed throughout the gangue. Much of the native copper in Lake Superior ores, for example, occurs in this form, a large percentage of the particles being so small as to render saving thereof very difficult, if not impossible, by the established mode of procedure for the treatment of such ores, which procedure consists, generally stated, in coarse crushing and then stamping the ore and afterward passing it through rolls to reduce the mass to the fineness of a large percentage of the copper-content. The resultant granular and pulverulent material is then passed, usually, over concentrating tables to separate the copper from the gangue. It is well known that in the treatment of most, if not all, native copper ores in the manner stated, there is much waste of the finer particles of copper, the loss in some cases reaching as high as twenty per cent. of the assay value of the copper in ore that is, nevertheless, profitably treated despite this loss. In the Lake Superior region alone there are dumps and pits containing millions of tons of slimes and tailings carrying from five to twenty pounds of metallic copper to the ton in the form of fine particles or flakes too small to be saved with economy by any appliances that it has been found commercially desirable to employ. Long experience has shown that no appliances compare with stamps and rolls or pebble mills for reducing the ore to the fine mesh necessary for producing physical separation of the larger proportion of the copper from the gangue. The fine particles of copper which are lost in the tailings are for the most part in the form of flakes or scales so thin in proportion to their other dimensions that they float off with the slimes. The stamping and rolling operations which tend to break up and pulverize the rock or gangue have a tendency to flatten out the copper particles, not already of flaky form and in fact increase the ultimate loss of the small particles when passing over the separating tables.

In Letters Patent No. 679,901, granted to me August 6, 1901, I described and claimed a process of treating native copper ore to render the fine particles of copper more easily separable from the gangue, which process consists, generally stated, in subjecting the ore to simultaneous triturating and torsional impacts to break up the non-metallic part and roll or twist the copper flakes into pellets, or the like, which would sink readily through water, or the slimy material of less specific gravity, when treated in a vanner or other suitable separating appliance. As the simultaneous triturating and torsional impacts can not be performed by stamps, rolls or pebble-mills, and require of necessity the use of appliances of a class which, to my knowledge, have not been improved to the same stage of economical perfection in the matter of pulverizing the gangue, the benefits contributed by the use of my patented process, in the treatment of certain native copper ores, have, in spite of increased recovery of copper per ton of ore treated, been comparatively little.

My object is to improve upon my aforesaid patented process, whereby the treatment of certain native copper-carrying rock, or other ore containing ductile metal, may be performed with greater economy than is possible by practising said process or any other method of which I am aware.

Broadly stated, my present invention consists in subjecting the ore, after it has been reduced to a fine state of division in which the gangue has released at least a large percentage of the flaky ductile metal, to a torsional rubbing action under pressure from opposite sides to twist the flakes into lumps of slug, pellet or analogous shape, and then separating said lumps from the gangue, as hereinafter described and claimed.

In carrying out my invention in the treatment of copper ore as mined, the ore may be coarse-crushed, then stamped and then rolled, all by the employment of the most up-to-date appliances to prepare the ore in the most approved and economical manner for separation of the copper from the gangue. The present most approved means of separating the larger particles of copper from the gangue may also be employed, whereby up to this point the saving may be about the same as hitherto. To this procedure I add the step of subjecting the slimes, or other material hitherto run off and wasted as tailings, to an action which will roll or twist the flaky particles of copper into lumps of slug, pellet or analogous shape, whereby substantially all, or at least a large percentage, of the copper which would otherwise go to waste may be easily saved in any of a number of well-known separating appliances. What may be called the pellet-forming action upon the copper-flakes, effected by rolling the ore containing the minute, ductile metal particles between extended surfaces, under pressure, which is the gist of the present invention, may be performed by any one of a number of appliances, as for example, one of the character of a burstone mill, where the material is run between closely-adjacent disks, either rotating in opposite directions, or only one with relation to the other, and presenting working-faces which operate to roll up the copper flakes of the mass fed between said faces. These working-faces may be given relatively different motions, as a relative reciprocating motion or a relative gyratory motion.

In the accompanying drawing—Figure 1 is a diagrammatic view of a plant which may be employed in carrying out my present invention; and Fig. 2, an enlarged sectional view of the pellet-forming feature of the plant.

The tailings, or coarse-ground product, containing copper, silver, gold, or other ductile metal, in fine, flaky particles, is fed from the hopper 5 to a pebble-mill 6, whence it is discharged in the form of powder, or slimes, into a pellet-forming apparatus 7. The apparatus 7 has a cup-shaped disk 8 provided with a central feed-opening 9 and an under, suitably-shod, annular, flat working-face 10. The disk 8 is secured to a central spider 11 extending from a sleeve 12 which is feathered upon the lower end of a shaft 13, having a drive-pulley 14. The disk rotates over a flat working-plate 15 mounted in a base 16 which rests on rollers 17 and is reciprocated by an eccentric 18 carried by a rotating shaft 19. In the base 16 around the plate or shoe 15 is a gradually-deepening trough 20 terminating in an outlet-spout 21. In the reciprocation of the base the spout moves over a hopper 22 which empties into an ore-jig 23. The jig shown may be of any well-known type, wherein the material to be treated is fed upon and advanced along a screen to form a jig-bed. Water is caused to pulsate upwardly through the screen to stratify the constituents of the material according to their specific gravities, and the material of the lower stratum is drawn off and saved while the lighter, or waste, material is carried off through the spout 24.

As the ore is treated in the pebble-mill 6 its triturable non-metallic contents are reduced to powder, while the tendency of the pebbles is to flatten or render thinner the ductile metal-contents of the ore. The pebble-mill discharges into the cup formed by the rotating member 8 and, when necessary, water is added to the material, as from a pipe 25. The member 8 may rest solely of its own weight against the member 16 or, as is usually provided in grinding mills, the pressure between the members 8, 16 may be regulated by suitable means. In the rotation of the member 8 and reciprocation of the member 16 the material passing through the opening 9 and thence between the working faces 10, 15, is subjected to a rolling and twisting action between extended surfaces, under pressure, which results in transforming the flaky particles of ductile metal into lumps of slug, pellet or analogous shape, all the material, as it is treated, moving gradually toward the trough 20, to be discharged through the spout 21. The flaky particles of ductile metal are, by this treatment, changed to a form in which they will readily sink in water, so that when discharged into the jig 23 substantially all or at least a large percentage of the ductile metal values may be separated quickly and cheaply from the triturated gangue.

It is to be understood that according to my present invention, as practised by the plant shown by way of illustration, the preparation of the ore, in the sense of its being reduced to the proper state of division, is carried on, more or less completely, in other apparatus, before it is subjected to treatment in the pellet-forming apparatus, though naturally there will be more or less trituration of the gangue in any apparatus, that I am aware of, that could be employed for the pellet-forming operation.

My present invention is not limited to any particular means for reducing the ore to the desired state of division, nor to any particular means for separating the metal values from the gangue after the pellet-forming operation. Furthermore, the pellet-forming apparatus may be of any construction which will produce the desired results in the pellet-forming step of the procedure.

In working tailings from dumps or tailing-pits the material, if in a suitable, finely-divided condition, may be passed directly through a suitable pellet-forming appliance to change the ductile-metal contents from flakes to pellets, or the like, for the purpose stated; or the said tailings may be first screened so that the fines alone may be subjected to the pellet-forming operation, and if the coarse material screened off contains sufficient values it may be subjected to crushing, as by means of rolls, and then treated as described to change the flaky ductile-metal contents to pellets, or the like.

It will be understood from the detailed description given that my present process, while involving the generic idea of slug-forming, or pellet-forming, first disclosed in my above-mentioned patent, is a wet process, in which the pellet-forming action is carried on by rolling and twisting the metal particles between relatively moving extended surfaces, under pressure, in the presence of water, and preferably in constantly changing direction, whereby the non-metallic constituents of the ore are reduced both by the attrition of the pellet-rolling plates and that of the pellets being rolled therebetween to a finely pulverulent condition, while the fine particles of metal are rolled and twisted, and constantly crossing the paths of other such particles are, because of their ductile character, rolled or massed together in rolls, slugs or pellets, of such form and mass as to be readily concentratable. Experience has demonstrated that the improved process is capable of saving a much higher percentage of copper carried in fine particle form than can be saved by my aforesaid patented process; also, that the present process can be effectively practised by the use of machines possessing high capacity, economy of operation, and the greatest durability and longevity—all of the utmost importance with respect to a process capable of practical utilization in the saving of copper, where the average metal content may drop to 1% of the ore treated, from which it will be readily understood that it is necessary that a high percentage of the metal must be saved or the mine cannot be profitably operated. In my earlier process, the gangue, when reduced to pulverulent form, interfered to quite a large extent with the agglomeration of the metallic particles and also tended to increase the percentage of impurities in the concentrates. These objections are largely obviated in my present process, and, in fact, the gangue, as a friction element, aids in the pellet-rolling operation, but finally, in its finely pulverulent ultimate form, is freed from the metal almost wholly, so that a high grade concentrate is obtained.

It is known, of course, that the pebble-mill is employed to effect fine grinding, the purpose being to free occluded metal particles which are not released from the matrix by the stamp-mill or by any coarse-grinding machine. In passing through the machine illustrated in Fig. 2, the gangue is still further triturated and comminuted, while the metal particles are rolled together into slug or pellet form, as above described. The ore-reduction work performed by the mechanism shown in Fig. 2 is lessened, of course, by the employment of the pebble-mill.

No undue limitation is to be understood from the detailed description given, it being my intention to claim the novelty of my present process in view of the process of my aforesaid patent, over which patented process the present improvement possesses important and vital advantages, rendering the process thoroughly practical for the recovery of the metal from ore which could not heretofore be handled with such chance of profit as would warrant the effort.

What I regard as new and desire to secure by Letters Patent is:

1. The method of treating finely divided ore, containing ductile metal in flaky condition and gangue in pulverized condition, which consists in subjecting such ore under direct pressure from opposite sides between practically smooth surfaces to a torsional rubbing action to twist the flakes into lumps of slug, pellet or analogous shape, and then separating said lumps from the gangue.

2. The method of treating ore containing ductile metal in fine particles, which consists in rolling the ore between extended surfaces, under pressure, until the ductile particles are rolled together in pellets or slugs.

3. The method of treating ore containing ductile metal in fine particles, which consists in rolling the ore, in the presence of water, between extended surfaces, under pressure, until the ductile particles are rolled together in pellets or slugs and the gangue is left in pulverulent form.

4. The method of treating ore containing ductile metal in fine particles, which consists in rolling the ore in ever-changing direction between extended surfaces, under pressure, and in the presence of water, until the ductile particles are rolled together in pellets or slugs and the gangue is left in fine pulverulent form.

THOMAS J. LOVETT.

In presence of—
D. C. THORSEN,
E. D. STEELE.